United States Patent [19]
Mezzanotte

[11] 3,973,612
[45] Aug. 10, 1976

[54] BREAKER STRUCTURES OF RADIAL TIRES
[75] Inventor: Mario Mezzanotte, Milan, Italy
[73] Assignee: Industrie Pirelli S.p.A., Milan, Italy
[22] Filed: July 12, 1974
[21] Appl. No.: 488,171

[30] Foreign Application Priority Data
July 23, 1973 Italy .................................. 26906/73

[52] U.S. Cl. ..................... 152/361 FP; 152/361 DM
[51] Int. Cl.² ............................................ B60C 9/20
[58] Field of Search.... 152/361 R, 361 FP, 362 DM

[56] References Cited
UNITED STATES PATENTS
3,554,261  1/1971  Mirtain et al. ................. 152/361 FP
3,786,851  1/1974  Mirtain ......................... 152/361 DM
3,831,656  8/1974  Seager et al. ................. 152/361 DM
3,831,657  8/1974  Dillenschneider ........... 152/361 DM Primary Examiner—Drayton E. Hoffman
Attorney, Agent, or Firm—Stevens, Davis, Miller & Mosher

[57] ABSTRACT

A radial tire having a breaker structure constituted by a strip of metal cords, inclined with respect to the equatorial axis of the tire, having folded external edges, and by a layer of textile cords, arranged in a direction parallel to the equatorial axis of the tire, superimposed to the strip with folded edges.

8 Claims, 2 Drawing Figures

BREAKER STRUCTURES OF RADIAL TIRES

The present invention relates to "radial" tires, namely to the tires provided with a carcass formed by cords lying in radial planes or forming small angles with said planes.

More precisely, the invention concerns breaker structures for radial tires.

It is known that such a structure, which in the present description will be simply called "breaker", affects in a critical manner the tire behavior, according to is geometry (namely the angular relationships between the cords constituting it) and according to the materials of which said cords are formed.

Tires of this kind are known for their long life and for other important functional characteristics, as road holding, driving safety and comfort.

In view of these features, the geometry and the selection of the materials of the breaker take a particular importance and the results obtained till now in various known employments have proved satisfactory. However, the ever increasing demand for better performance of tires has led to use breaker structures which tend to enhance in particular the features of road holding and driving safety; the consequence is a reduction of comfort due to the excessive stiffness of the breaker and a worsening of the tire life, due for the most part to premature and irregular wear.

The present invention aims at providing a tire which, besides having very good features of road holding and driving safety, possesses also good characteristics as regards comfort and regular wear. This is obtained with the simultaneous use of layers of textile cords or layers of metal cords, appropriately superimposed, and by means of an orientation of the cords of the various layers at pre-established angles.

Accordingly, the object of the present invention is a pneumatic tire for vehicle wheels comprising a radial carcass, a tread and a breaker structure formed by layers of textile cords and layers of metal cords, wherein said breaker structure comprises :
- a. at least one strip of metal cords inclined with respect to the equatorial axis of the tire at an angle ranging between 10° and 30°, said strip being so folded that at least a folding line is present at each lateral edge, said folded strip having a greater skirting of a width not smaller than that of the tire tread and two smaller skirtings, each having a width ranging between 20% and 40% with respect to the width of said greater skirting;
- b. at least one layer of textile cords arranged in a direction parallel to the equatorial axis of the tire, the material of said cords being such that it reduces in length when subjected to the action of heat, said layer being arranged in a radially outer position with respect to said metal cords and having a width smaller than the width of the greater skirting of said folded strip.

In the present description, the expression "width of the tread" means the whole part of the tire which comes into contact with the ground, both during a rectilinear travel and on cornering, so that, in the tires having a tread radiused to the sidewall portion by means of more or less wide zones of connection, the tread is constituted also by the lateral portion concerning said zones of connection.

The main advantage obtained by adopting the above described breaker structure is given by the fact that the folded strip of metal cords inclined with respect to the equatorial axis of the tire is able to withstand the transversal stresses acting on the tire in use; in particular, the foldings present on each lateral edge of the breaker contribute substantially to increase the transversal stiffness of the breaker itself, and moreover are able to resist efficiently to the effect of the centrifugal force noticed in particular at high speed.

The stiffening action of the metal cords is aided by the textile cords which, being arranged in circumferential direction, are able to oppose to the torsional stresses suffered by the tire when this is subjected to a change of direction.

The result of this cooperation, besides depending on the particular arrangement of the cords, is also due to the material forming the latter, which has the property of shrinking under the action of heat.

In fact, the layers of textile cords have a tendency to shrink in consequence of the thermal treatment suffered during the tire curing; said shrinkage would take place at the time of removing the tire from the mold if the cords were actually free to reduce their length; however, the presence of the strip of metal cords, which has a good resistance to compression, prevents in the practice the shrinkage of the textile cords.

When the tire is cooled, the textile cords are therefore in condition of pre-tension, and this reduces the extensibility of the cords themselves and makes their dynamometric characteristics more similar to those of the metal cords of the underlying folded strip.

This reduction of extensibility confers to these cords a further resistance to the above mentioned torsional stresses on the tire.

In conclusion, the breaker structure according to the present invention possesses a considerable stiffness in respect of transversal, torsional and circumferential stresses on the tire, constituting a solid base for the blocks of the tread, which are thus stiffened and have consequently a lower mobility at the time they enter or leave the area of impression on the ground.

Therefore, this feature contributes to reduce the sliding of the tread against the ground and to minimize wear.

Moreover, as wear in a radial tire is in general more evident in the lateral zones of the tread than in the central zone of the latter, the greater stiffness given by the folding of the strip of metal cords lying at each edge of the breaker according to the present invention affords the further advantage of substantially reducing the occurrence of irregular wear localized on the surface of the tread itself.

If the reduced mobility of the tread blocks has a favourable effect as regards wear, as described above, said feature permits also a substantial improvement in the road holding of the tire on wet ground; in fact, as the blocks and the grooves of the tread tend to maintain their original molding position and therefore an alteration of the tread pattern caused by the stresses acting on the tire in use is less probable, it follows that the elimination of the water picked up from the ground is facilitated and that the tread is better able to cut the water film interposed between the tire and the ground, with a consequent improvement of road holding.

The breaker structure according to the present invention, besides the above described advantages, is able to improve the tire comfort; in fact, as the opposite ends of the smaller skirtings of the folded strip of metal cords do not reach the equatorial axis of the tire, but are appropriately spaced apart from it, the central zone of the breaker is radially more flexible than the lateral zones, with an advantageous effect on the degree of comfort of the tire.

According to a preferred alternative embodiment of the present invention, the opposite ends of said smaller skirtings of the folded strip of metal cords are equidistant from the equatorial axis of the tire and are mutually spaced by a value comprised between 20% and 60% with respect to the width of the greater skirting of said folded strip.

Preferably, the smaller skirtings of said folded strip lie in a radially outer position with respect to said greater skirting.

According to a preferred embodiment of the present invention, the layer of textile cords has a width which is greater than the distance between the opposite ends of the smaller skirtings of the folded strip of metal cords and is smaller than the width of the greater skirting of said strip.

Preferably, the width of said layer of textile cords is comprised between 50% and 80% with respect to the width of the greater skirting of the folded strip of metal cords.

The present invention will now be better illustrated with reference to the attached drawing, given by way of example only, in which :

FIG. 1 illustrates the section of a tire having a tread 1 and a carcass 2, said carcass being formed by cords lying in radial planes or forming small angles with said planes.

A breaker 3 is interposed between said carcass and said tread; it comprises a strip 4 of metal cords and two layers 5 and 6 of nylon cords, said layers 5 and 6 being arranged radially outwardly with respect to the metal cords of strip 4.

Figure 2:
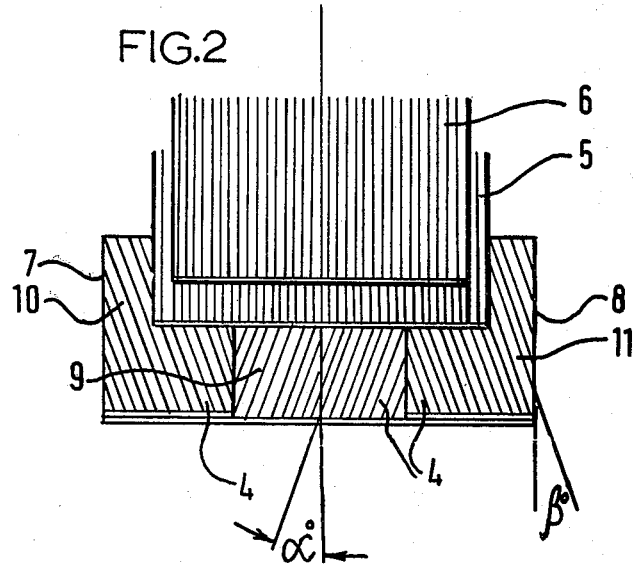
- FIG. 2 represents in plan view the breaker of the tire illustrated in FIG. 1, with parts broken away to show the path of the cords.

The strip 4 of metal cords has two foldings 7 and 8 at the lateral edges of the breaker 3, so as to form a greater skirting 9 and two smaller skirtings 10 and 11, visible also in FIG. 2, said smaller skirtings being arranged radially outwardly with respect to said greater skirting.

Figure 1:
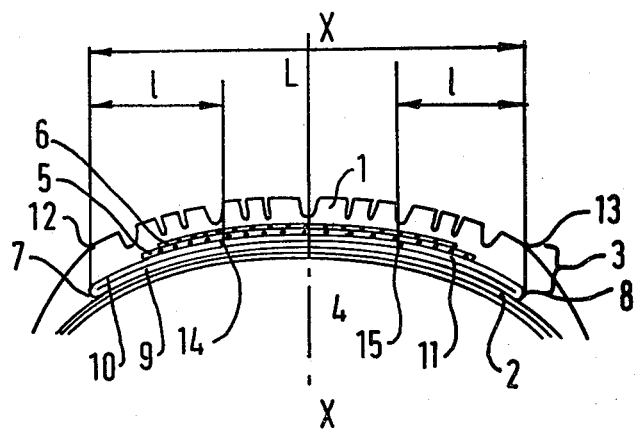
- FIG. 1 represents diagrammatically the section of the tread zone of a tire according to the present invention.

The width L of the greater skirting 9 corresponds substantially to the width of the tread, this expression meaning the whole part of the tire which comes into contact with the ground both during rectilinear travel and on cornering, and which, in the example of FIG. 1, is defined by the length comprised between corners 12 and 13.

The width 1 of each of the smaller skirtings is smaller than said width L and, in the example shown in FIG. 1, has a value equal to 30% with respect to the width L of said greater skirting.

In this way the opposite ends 14 and 15 of said smaller skirtings 10 and 11 are spaced apart by a value equal to 40% of the width L of the greater skirting 9 and lie at the same distance with respect to the midline XX of the section.

As it is better visible in FIG. 2, the metal cords of the greater skirting 9 are parallel to one another, and are inclined at an angle $\alpha$ equal to 20° with respect to the equatorial plane of the tire; correspondingly, the metal cords of the smaller skirtings 10 and 11 are inclined in opposite sense with respect to the same plane, at an angle $\beta$ equal to 20°.

In a radially outer position with respect to the greater skirting 9 and to the two smaller skirtings 10 and 11, there are two layers 5 and 6 of nylon cords oriented along the circumferential direction of the tire. Said layers have a substantially equal width or graduated widths for reasons of construction; the value of said widths is greater than the distance between the opposite ends 14 and 15 of the smaller skirtings 10 and 11 of the folded strip 4 of metal cords, but is smaller than the width L of the greater skirting 9 of said strip 4. More precisely, in the example represented in FIGS. 1 and 2, the width of said layers 5 and 6 is of the order of 70% with respect to the width L of the greater skirting 9 of the strip 4 of metal cords.

It is understood that the present invention is not limited to the above reported example, but that it includes any alternative embodiment deriving from the above indicated inventive concept.

What is claimed is:

1. A pneumatic tire for vehicle wheels comprising a radial carcass, a tread and a breaker structure wherein said breaker structure comprises:
    - a. one strip of metal cords inclined with respect to equatorial axis of the tire at an angle ranging between 10° and 30°, said strip being so folded that a folding line is present at each lateral edge, said folded strip having a larger skirting of a width not smaller than that of the tire tread and two smaller skirtings, each of said smaller skirtings having a width ranging between 20% and 40% with respect to the width of said larger skirting;
    - b. at least one layer of textile cords arranged in a direction parallel to the equatorial axis of the tire, the material of said cords being such that it reduces in length when subjected to the action of heat, said layer being arranged in a radially outer position with respect to said metal cords and having a width smaller than the width of the larger skirting of said folded strip.

2. A pneumatic tire for vehicle wheels as in claim 1, wherein the opposite ends of said smaller skirtings are equidistant from the equatorial axis of the tire and are mutually spaced apart by a distance between 20% and 60% with respect to the width of the larger skirting of said folded strip.

3. A pneumatic tire for vehicle wheels as in claim 2, wherein the smaller skirtings of said folded strip lie in a radially outer position with respect to said larger skirting.

4. A pneumatic tire for vehicle wheels as in claim 2, wherein said layer of textile cords has a width which is larger than the distance between the opposite ends of the smaller skirtings of the folded strip of metal cords and is smaller than the width of the larger skirting of said strip.

5. A pneumatic tire for vehicle wheels as in claim 4, wherein the width of said layer of textile cords is between 50% and 80% with respect to the width of the larger skirting of the folded strip of metal cords.

6. A pneumatic tire for vehicle wheels as in claim 1, wherein the textile cords are nylon cords.

7. A pneumatic tire comprising a radial carcass having a crown portion, a tread surrounding the crown portion and a breaker structure reinforcing the tread disposed circumferentially about the crown portion between the carcass and tread, said breaker structure comprising a first ply of only one strip of metallic strands inclined at an angle of from 10° to 30° with respect to the equatorial axis of the tire, said strip being folded inwardly along each edge thereof to provide a folded over portion having a width of from 20% to 40% of the total width of the strip after folding, the folded strip underlying the tread throughout the width of the tread with the folded over portions facing the tread, and, disposed between the first ply and the tread, a second ply of at least one unfolded layer of heat shrinkable textile cords extending circumferentially about the crown portion of the tire substantially parallel to the equatorial axis of the tire, the width of the second ply being smaller than the folded width of the first ply but partially overlapping the folded over portions.

8. The tire of claim 7 wherein the second ply comprises two layers of textile cords and the layer adjacent to the first ply is of a larger width than the other layer.

* * * * *